United States Patent
Wu et al.

(10) Patent No.: US 11,916,684 B2
(45) Date of Patent: Feb. 27, 2024

(54) RANGE BASED HANDSHAKE FOR WIRELESS COMMUNICATION

(71) Applicant: QUALCOMM Incorporated, San Diego, CA (US)

(72) Inventors: Shuanshuan Wu, San Diego, CA (US); Kapil Gulati, Belle Mead, NJ (US); Arthur Gubeskys, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 65 days.

(21) Appl. No.: 17/332,089

(22) Filed: May 27, 2021

(65) Prior Publication Data

US 2022/0045807 A1    Feb. 10, 2022

Related U.S. Application Data

(60) Provisional application No. 63/061,362, filed on Aug. 5, 2020.

(51) Int. Cl.
*H04W 4/00* (2018.01)
*H04L 1/1867* (2023.01)
*H04W 24/10* (2009.01)
*H04B 17/318* (2015.01)
*H04W 72/0453* (2023.01)
*H04W 24/08* (2009.01)
*H04W 72/20* (2023.01)
*H04W 92/18* (2009.01)

(52) U.S. Cl.
CPC ......... *H04L 1/1896* (2013.01); *H04B 17/318* (2015.01); *H04W 24/08* (2013.01); *H04W 24/10* (2013.01); *H04W 72/0453* (2013.01); *H04W 72/20* (2023.01); *H04W 92/18* (2013.01)

(58) Field of Classification Search
CPC ... H04L 1/1896; H04B 17/318; H04B 17/327; H04W 24/08; H04W 24/10; H04W 72/0406; H04W 72/0453; H04W 92/18; H04W 52/262
See application file for complete search history.

(56) References Cited

U.S. PATENT DOCUMENTS

| 2021/0045093 A1* | 2/2021 | Rao | H04W 72/04 |
| 2022/0045807 A1* | 2/2022 | Wu | H04B 17/327 |
| 2022/0166556 A1* | 5/2022 | Lee | H04L 1/1825 |

FOREIGN PATENT DOCUMENTS

WO    WO-2020033088 A1 *   2/2020   ........... H04B 17/318

OTHER PUBLICATIONS

J. Kim, O. Jo and S. W. Choi, "Feasibility of Index-Coded Retransmissions for Enhancing Sidelink Channel Efficiency of V2X Communications," in IEEE Access, vol. 7, pp. 6545-6552, 2019, doi: 10.1109/ACCESS.2018.2888586. (Year: 2019).*

* cited by examiner

*Primary Examiner* — Thai D Hoang
(74) *Attorney, Agent, or Firm* — Patterson & Sheridan, LLP

(57) ABSTRACT

Aspects of the present disclosure provide apparatus, methods, processing systems, and computer readable mediums for channel and/or resource selection for sidelink communications. In some cases, a transmitter user equipment UE may transmit, on a sidelink channel used for communicating with other UEs, a control message indicating at least one range, monitor for feedback associated with detection of the control message by one or more other UEs within the indicated range, and transmit data if the feedback indicates at least that the sidelink channel is free.

30 Claims, 10 Drawing Sheets

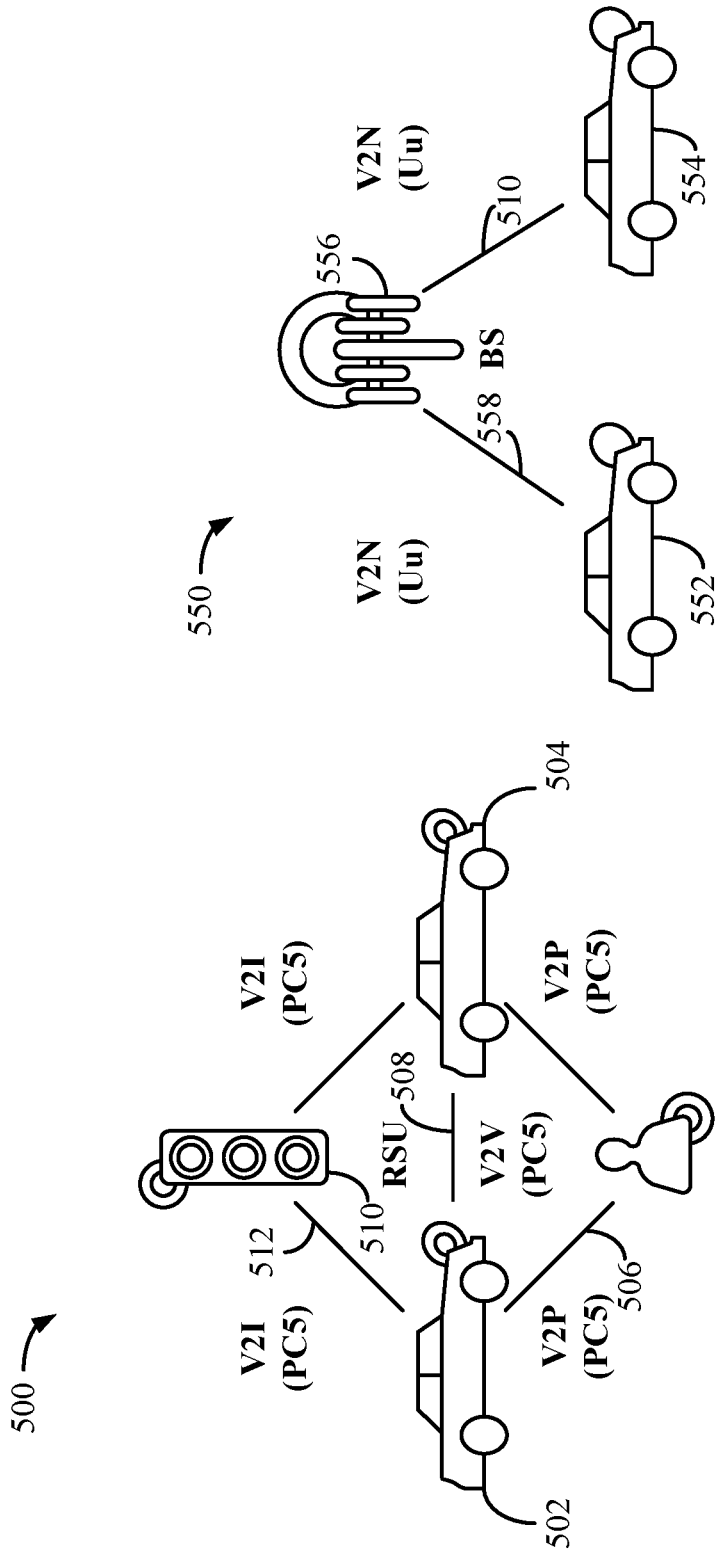

700

702
TRANSMIT, ON A SIDELINK CHANNEL USED FOR COMMUNICATING WITH OTHER UES, A CONTROL MESSAGE INDICATING AT LEAST ONE RANGE

704
MONITOR FOR FEEDBACK ASSOCIATED WITH DETECTION OF THE CONTROL MESSAGE BY ONE OR MORE OTHER UES WITHIN THE INDICATED RANGE

706
TRANSMIT DATA IF THE FEEDBACK INDICATES AT LEAST THAT THE SIDELINK CHANNEL IS FREE

FIG. 7

RANGE BASED HANDSHAKE FOR WIRELESS COMMUNICATION

CROSS REFERENCE TO RELATED APPLICATION

This application hereby claims priority under 35 U.S.C. § 119 to U.S. Provisional Patent Application No. 63/061,362, filed on Aug. 5, 2020, the contents of which are incorporated herein in their entirety.

INTRODUCTION

Aspects of the present disclosure relate to wireless communications, and more particularly, to channel selection in systems that utilize both licensed and unlicensed frequency bands.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless nodes to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

Sidelink communications are communications from one UE to another UE. As the demand for mobile broadband access continues to increase, there exists a need for further improvements in NR and LTE technology, including improvements to sidelink communications. Preferably, these improvements should be applicable to other multi-access technologies and the telecommunication standards that employ these technologies.

Further, as additional resources are deployed in systems, such as both licensed and unlicensed spectrum, various challenges and opportunities arise for optimizing such resources.

SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description" one will understand how the features of this disclosure provide advantages that include improved device-to-device communications in a wireless network.

Certain aspects of this disclosure provide a method for wireless communications by a transmitter user equipment (UE). The method generally includes transmitting, on a sidelink channel used for communicating with other UEs, a control message indicating at least one range, monitoring for feedback associated with detection of the control message by one or more other UEs within the indicated range, and transmitting data if the feedback indicates at least that the sidelink channel is free.

Certain aspects of this disclosure provide a method for wireless communications by a receiver user equipment (UE). The method generally includes detecting, on a sidelink channel used for communicating with other UEs, a control message from a transmitter UE indicating at least one range, determining the receiver UE is within the at least one range, and transmitting feedback to the transmitter UE indicating whether the sidelink channel is free.

Certain aspects of this disclosure provide a transmitter user equipment (UE). The transmitter user equipment (UE) generally includes means for transmitting, on a sidelink channel used for communicating with other UEs, a control message indicating at least one range, means for monitoring for feedback associated with detection of the control message by one or more other UEs within the indicated range, and means for transmitting data if the feedback indicates at least that the sidelink channel is free.

Certain aspects of this disclosure provide a receiver user equipment (UE). The a receiver user equipment (UE) generally includes means for detecting, on a sidelink channel used for communicating with other UEs, a control message from a transmitter UE indicating at least one range, means for determining the receiver UE is within the at least one range, and means for transmitting feedback to the transmitter UE indicating whether the sidelink channel is free.

Certain aspects of this disclosure provide a transmitter user equipment (UE). The transmitter user equipment (UE) generally includes a transmitter configured to transmit, on a sidelink channel used for communicating with other UEs, a control message indicating at least one range and a processing system configured to monitor for feedback associated with detection of the control message by one or more other UEs within the indicated range, wherein the transmitter is further configured to transmit data if the feedback indicates at least that the sidelink channel is free.

Certain aspects of this disclosure provide a receiver user equipment (UE). The receiver user equipment (UE) generally includes a processing system configured to detect, on a sidelink channel used for communicating with other UEs, a control message from a transmitter UE indicating at least one range and determine the receiver UE is within the at least one range, and a transmitter configured to transmit feedback to the transmitter UE indicating whether the sidelink channel is free.

Certain aspects of this disclosure provide a computer-readable medium for wireless communications by a transmitter user equipment (UE). The computer-readable medium generally includes codes executable by an apparatus to output, for transmission on a sidelink channel used for communicating with other UEs, a control message indicating at least one range, monitor for feedback associated with detection of the control message by one or more other UEs within the indicated range, and output, for transmission, data if the feedback indicates at least that the sidelink channel is free.

Certain aspects of this disclosure provide a computer-readable medium for wireless communications by a receiver user equipment (UE). The computer-readable medium generally includes codes executable by an apparatus to detect, on a sidelink channel used for communicating with other UEs, a control message from a transmitter UE indicating at least one range, determine the receiver UE is within the at least one range, and output feedback for transmission to the transmitter UE indicating whether the sidelink channel is free.

Certain aspects of this disclosure provide an apparatus for wireless communications by a transmitter user equipment (UE). The apparatus generally includes an interface configured to output for transmission, on a sidelink channel used for communicating with other UEs, a control message indicating at least one range and a processing system configured to monitor for feedback associated with detection of the control message by one or more other UEs within the indicated range, wherein the interface is further configured to output data for transmission if the feedback indicates at least that the sidelink channel is free.

Certain aspects of this disclosure provide an apparatus for wireless communications by a receiver user equipment (UE). The apparatus generally includes a processing system configured to detect, on a sidelink channel used for communicating with other UEs, a control message from a transmitter UE indicating at least one range and determine the receiver UE is within the at least one range, and an interface configured to output feedback for transmission to the transmitter UE indicating whether the sidelink channel is free.

Aspects of the present disclosure provide, UEs, means for, apparatuses, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIGS. 5A and 5B show diagrammatic representations of example vehicle to everything (V2X) systems in accordance with some aspects of the present disclosure.

FIG. 7 illustrates example operations for wireless communications by a transmitter UE, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
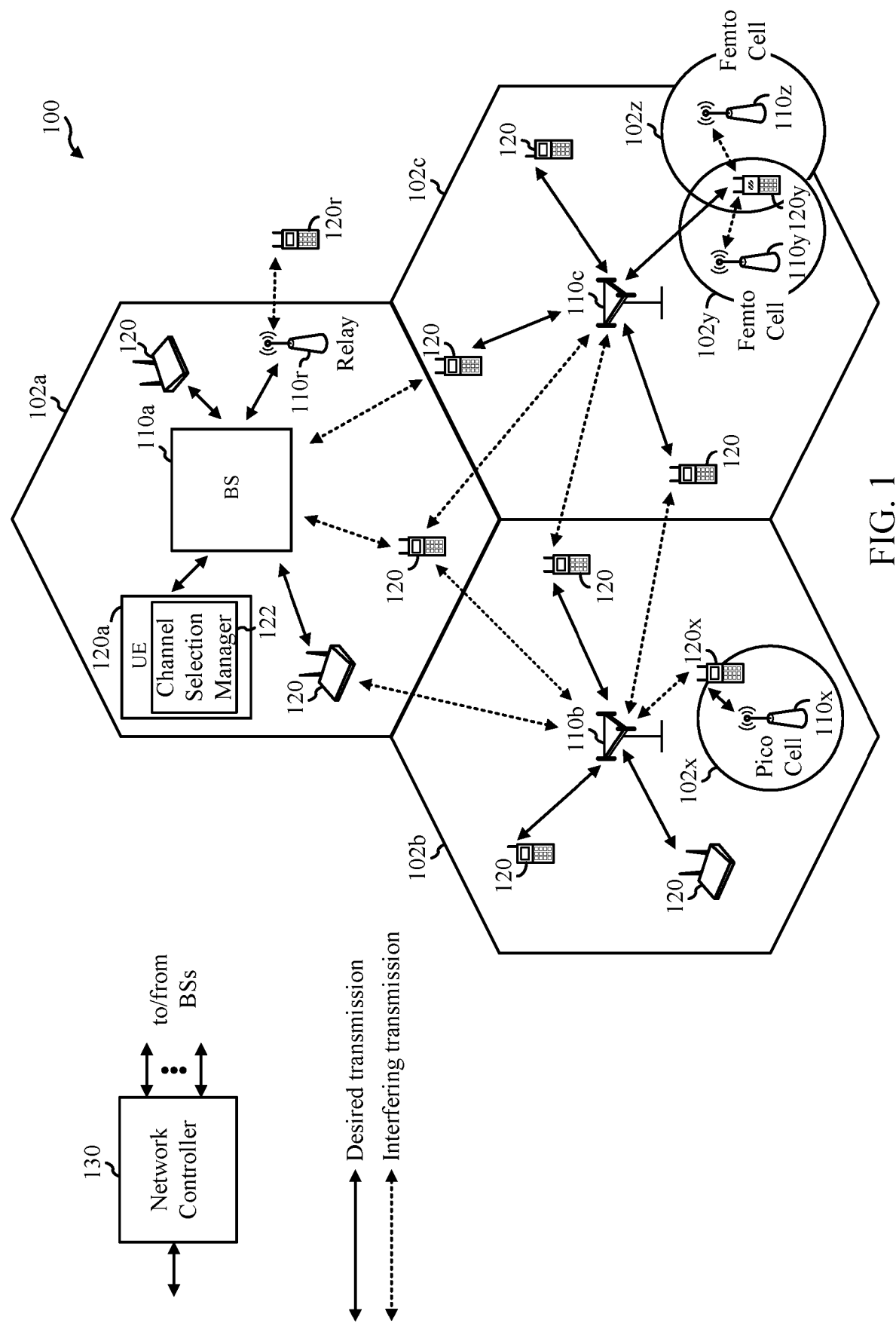
FIG. 1 is a block diagram conceptually illustrating an example telecommunications system, in accordance with certain aspects of the present disclosure.

Aspects of the present disclosure provide apparatus, methods, processing systems, and computer readable mediums for channel selection in systems that utilize both licensed and unlicensed frequency bands. As will be described in greater detail below, user equipments (UEs) that share unlicensed frequency band may utilize a range-based handshake mechanism for V2X communication. The mechanism may help address hidden node problems in V2X communications systems.

In wireless networking, the hidden node problem generally refers to a scenario where a transmitter device identifies the channel is free or a resource is available for a transmission, but a receiver device may not observe a free channel or the resource being available, due to interference caused by a device that is hidden to the transmitter UE. This can lead to difficulties in access control, especially in a broadcast or groupcast system, where a data transmission may be intended to multiple receiver devices.

The mechanism (or protocol) propose herein may be applicable to V2X communication in licensed spectrum (e.g., intelligent transport system ITS where hidden nodes may be other V2X UEs), and may also be applicable in V2X unlicensed spectrum where a hidden node may be a device communicating via another wireless technology (e.g., a Wi-Fi device, Dedicated short-range communications (DSRC) device, or other type of device).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem (such as an AR/VR console and headset). Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

FIG. 1 illustrates an example wireless communication network 100 in which aspects of the present disclosure may be performed. For example, one or more UEs 120a of FIG. 1 may be vehicle UEs (V-UEs) with a channel selection manager 122 configured to perform operations described below with reference to FIG. 7 and/or FIG. 8 to detect and select a sidelink channel available for sidelink communications with another UE.

As illustrated in FIG. 1, the wireless communication network 100 may include a number of base stations (BSs) 110a-z (each also individually referred to herein as BS 110 or collectively as BSs 110) and other network entities. In aspects of the present disclosure, a roadside service unit (RSU) may be considered a type of BS, and a BS 110 may be referred to as an RSU. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
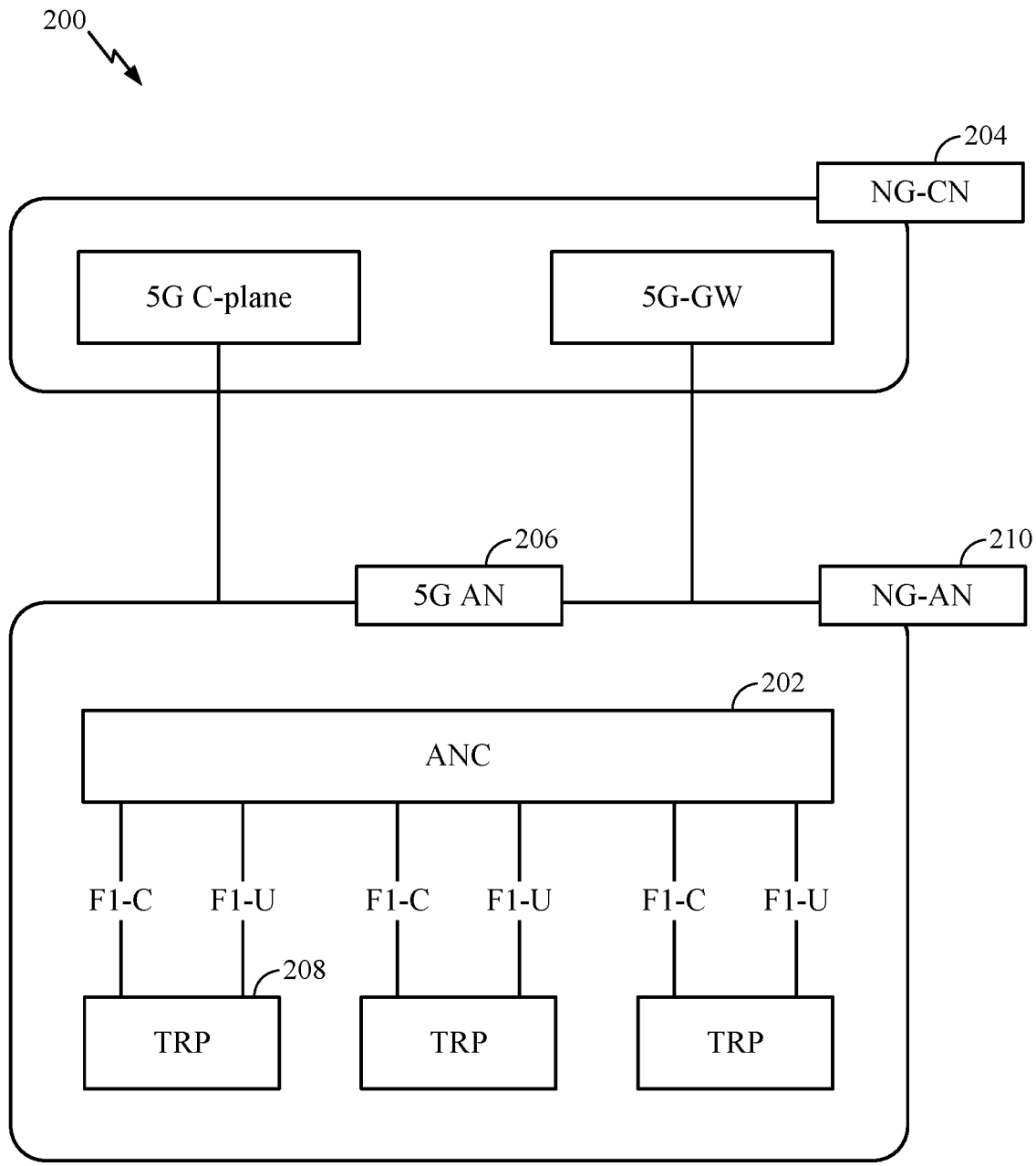
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. The Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
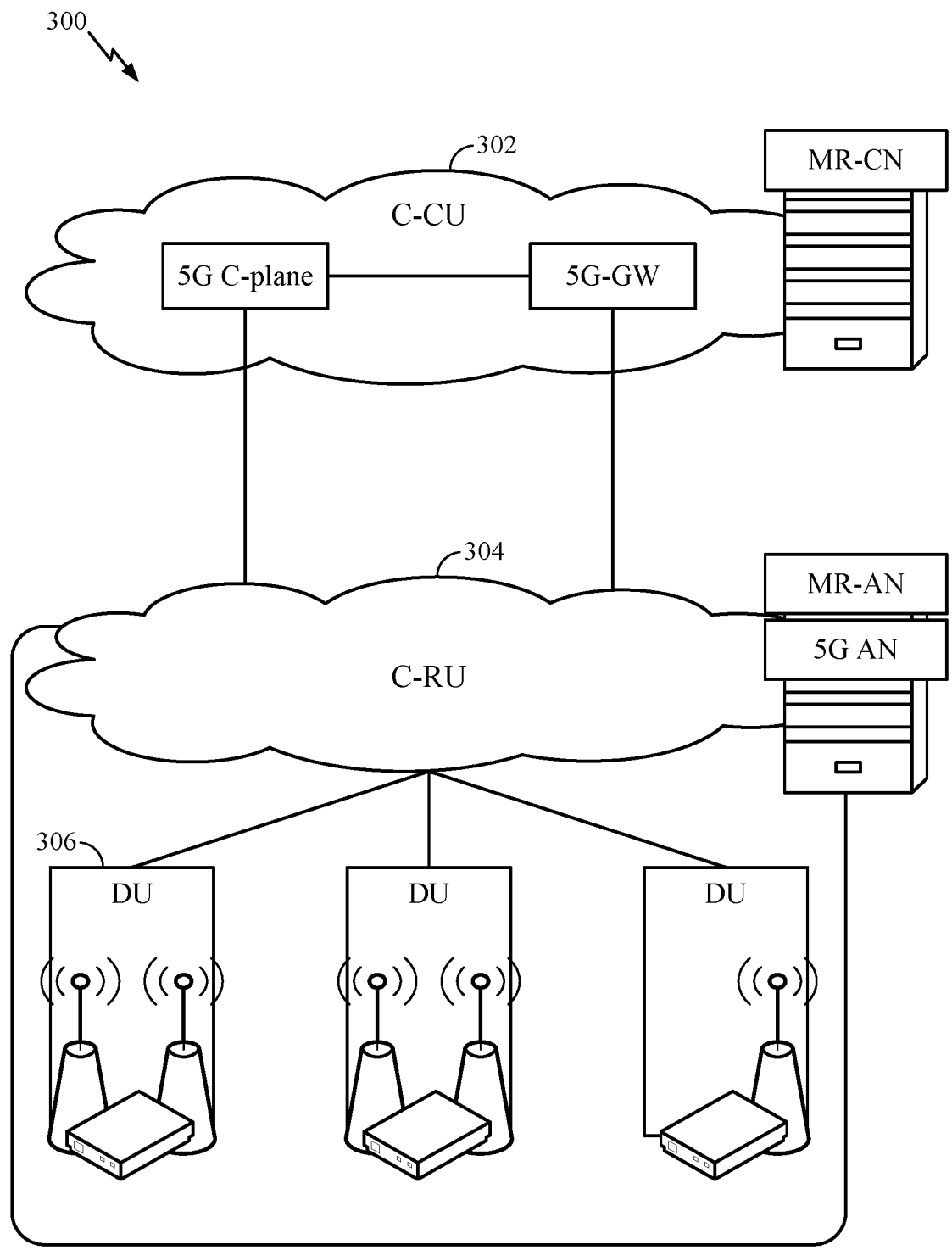
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
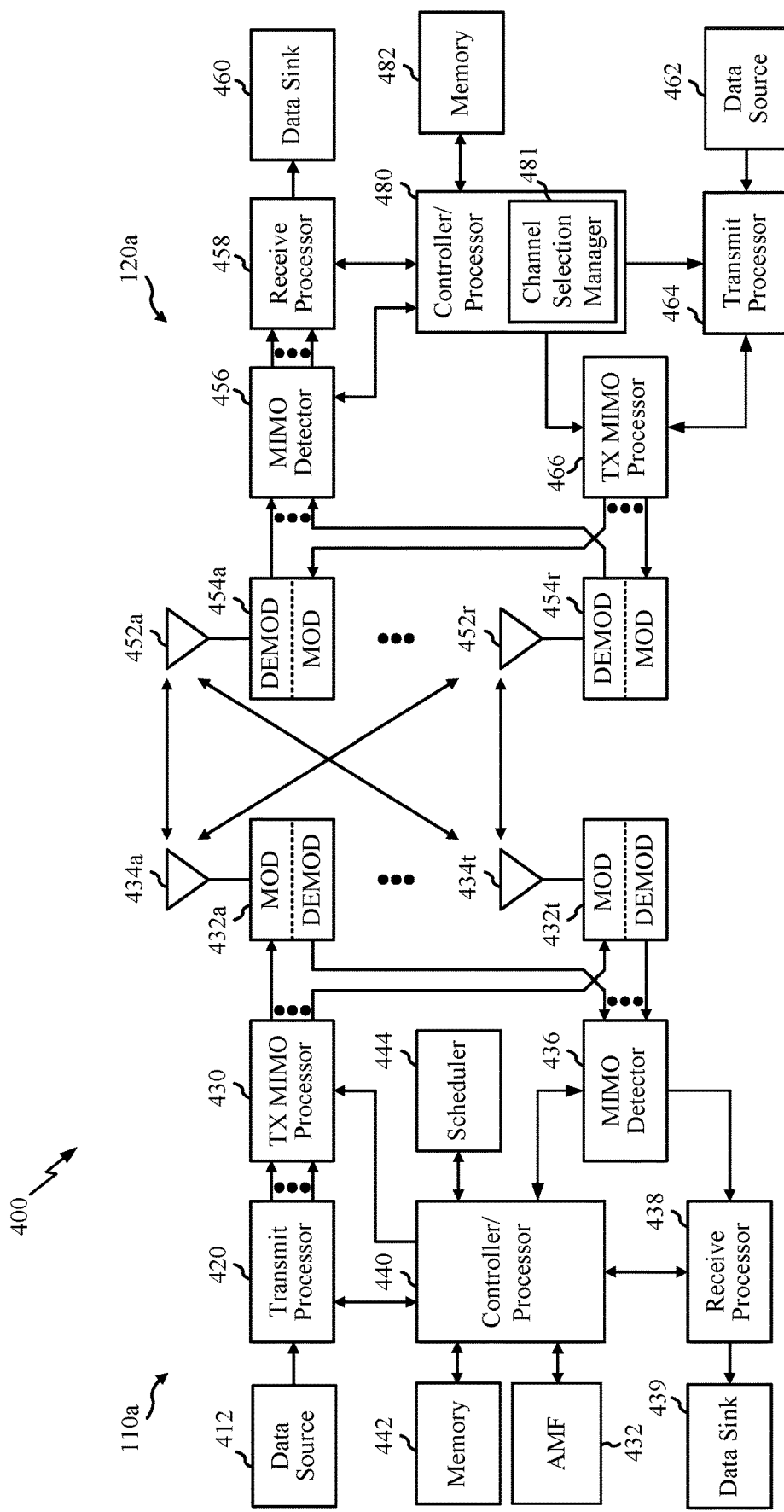
FIG. 4 is a block diagram conceptually illustrating a design of an example base station (BS) and user equipment (UE), in accordance with certain aspects of the present disclosure.

FIG. 4 illustrates example components of BS 110a and UE 120a (as depicted in FIG. 1), which may be used to implement aspects of the present disclosure. For example, antennas 452, processors 466, 458, 464, and/or controller/processor 480 of the UE 120a may be used to perform the various techniques and methods described herein with reference to FIG. 7 and/or FIG. 8. Similarly, antennas 434, processors 420, 438, 430, and/or controller/processor 440 of the BS 110a may be used to perform the various techniques and methods described herein with reference to FIG. 9.

At the BS 110a, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120a, the antennas 452a through 452r may receive the downlink signals from the base station 110a and may provide received signals to the demodulators (DE-MODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120a to a data sink 460, and provide decoded control information to a controller/processor 480.

On the uplink, at UE 120a, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110a. At the BS 110a, the uplink signals from the UE 120a may be received by the antennas 434, processed by the modulators 432, detected by a MIMO detector 436 if applicable, and further processed by a receive processor 438 to obtain decoded data and control information sent by the UE 120a. The receive processor 438 may provide the decoded data to a data sink 439 and the decoded control information to the controller/processor 440.

The controllers/processors 440 and 480 may direct the operation at the BS 110a and the UE 120a, respectively. The processor 440 and/or other processors and modules at the BS 110a may perform or direct the execution of processes for the techniques described herein. As shown in FIG. 2, the controller/processor 480 of the UE 120a has a channel selection manager 481 that may be configured for perform operations 700 of FIGS. 8 and/or 700 of FIG. 8. Although shown at the controller/processor 480 and controller/processor 440, other components of the UE 120a and BS 110a may be used performing the operations described herein. The memories 442 and 482 may store data and program codes for BS 110a and UE 120a, respectively. A scheduler 444 may schedule UEs for data transmission on the downlink, sidelink, and/or uplink.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks (WLANs), which may use an unlicensed spectrum).

FIGS. 5A and 5B show diagrammatic representations of example vehicle to everything (V2X) systems in accordance with some aspects of the present disclosure. For example, the vehicles (vehicle UEs or V-UEs) shown in FIGS. 5A and 5B may perform operations 600 of FIG. 6 select channels in an unlicensed frequency band and advertise their channel selections over a licensed frequency band, in an effort to coordinate communications other UEs.

Although the examples provided in FIGS. 5A and 5B are illustrative of two automotive CV2X devices, it can be appreciated that CV2X devices and environments may extend beyond these, and include any other suitable wireless communication devices and environments. For example, the CV2X devices may include devices on motorcycles, drones, or carried by users (e.g., pedestrian, bicyclist, etc.), and other environments may include indoor environments such as offices, residential, or urban infrastructure (e.g., subways, trains, etc.) environments. CV2X devices may also include, for example, quadcopters, drones, or any other unmanned aerial vehicle (UAV) or remotely piloted aerial system (RPAS), which may be configured to function as either a BS or UE, or may incorporate functional aspects of both. In some examples, a RPAS may functionally operate as a UE or BS, but may also function as a supervisor device configured to control communications and scheduling over an unlicensed band.

The V2X systems, provided in FIGS. 5A and 5B provide two complementary transmission modes. A first transmission mode, shown by way of example in FIG. 5A, involves direct communications (for example, also referred to as sidelink communications) between participants in proximity to one another in a local area. A second transmission mode, shown by way of example in FIG. 5B, involves network communications through a network, which may be implemented over a Uu interface (for example, a wireless communication interface between a radio access network (RAN) and a UE).

Referring to FIG. 5A, a V2X system 500 (for example, including vehicle-to-vehicle (V2V) communications) is illustrated with two vehicles 502, 504. The first transmission mode allows for direct communication between different participants in a given geographic location. As illustrated, a vehicle can have a wireless communication link 506 with an individual (i.e., vehicle to person (V2P), for example, via a UE) through a PC5 interface. Communications between the vehicles 502 and 504 may also occur through a PC5 interface 508. In a like manner, communication may occur from a vehicle 502 to other highway components (for example, roadside service unit 510), such as a traffic signal or sign (i.e., vehicle to infrastructure (V2I)) through a PC5 interface 512. With respect to each communication link illustrated in FIG. 5A, two-way communication may take place between elements, therefore each element may be a transmitter and a receiver of information. The V2X system 500 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 5B shows a V2X system 550 for communication between a vehicle 552 and a vehicle 554 through a network entity 556. These network communications may occur through discrete nodes, such as a base station (for example, an eNB or gNB), that sends and receives information to and from (for example, relays information between) vehicles 552, 554. The network communications through vehicle to network (V2N) links 558 and 510 may be used, for example, for long-range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data can be obtained from cloud-based sharing services.

In some circumstances, two or more subordinate entities (for example, UEs) may communicate with each other using sidelink signals. As described above, V2V and V2X communications are examples of communications that may be transmitted via a sidelink. When a UE is transmitting a sidelink communication on a sub-channel of a frequency band, the UE may be unable to receive another communication (e.g., another sidelink communication from another UE) in the frequency band. Other applications of sidelink communications may include public safety or service announcement communications, communications for proximity services, communications for UE-to-network relaying, device-to-device (D2D) communications, Internet of Everything (IoE) communications, Internet of Things (IoT) communications, mission-critical mesh communications, among other suitable applications. Generally, a sidelink may refer to a direct link between one subordinate entity (for example, UE1) and another subordinate entity (for example, UE2). As such, a sidelink may be used to transmit and receive a communication (also referred to herein as a "sidelink signal") without relaying the communication through a scheduling entity (for example, a BS), even though the scheduling entity may be utilized for scheduling or control purposes. In some examples, a sidelink signal may be communicated using a licensed spectrum (unlike wireless local area networks, which may use an unlicensed spectrum).

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions.

For the operation regarding PSSCH, a UE performs either transmission or reception in a slot on a carrier. A reservation or allocation of transmission resources for a sidelink transmission may be made on a sub-channel of a frequency band for a period of a slot. NR sidelink supports for a UE a case where all the symbols in a slot are available for sidelink, as well as another case where only a subset of consecutive symbols in a slot is available for sidelink.

PSFCH may carry feedback such as channel state information (CSI) related to a sidelink channel quality. A sequence-based PSFCH format with one symbol (not including AGC training period) may be supported. The following formats may be possible: a PSFCH format based on PUCCH format 2 and a PSFCH format spanning all available symbols for sidelink in a slot.

Certain wireless systems may be designed to operate on certain frequency bands. For example, LTE V2X may target a licensed 5.9 GHz frequency band (band B47), with an allocated bandwidth of 20 MHz. Spectrum scarcity for some systems may lead to considering unlicensed frequency bands. For example, NR V2X (e.g., in the US market) has prompted exploration of the possibility to deploy NR V2X in the unlicensed band.

In some cases, it may be beneficial to deploy a dual connectivity system which could enjoy the best of both worlds: the reliability of a licensed band and the availability of large spectrum in the unlicensed band (along with the enhancements of the NR V2X design).

In deployments in the unlicensed band, carrier selection may play a central role in the successful coexistence with other technologies. For example, both licensed assisted access (LAA) and NR unlicensed (NRU) deployments rely on carrier selection to avoid certain channels, such as channels with heavy wireless local area network (WLAN) activity to minimize mutual interference.

In LAA and NRU however, the carrier selection may be performed by the base station (BS) based on channel sensing. As a result, all UEs tune into the channel selected channel, by searching for the BS synchronization signal block (SSB) once, and remaining on that channel afterwards. In distributive systems, however, channel sensing is done by each UE.

Example Range Based Handshake for Wireless Communications

Unlike cellular communication (Uu), sidelink communication may happen in distributed manner, meaning there is no central node (like base stations) that control/schedule the communication between devices. As noted above, examples of sidelink communication include D2D, V2V, V2X, peer-to-peer.

Resource allocation in distributed systems may be autonomous. In such systems, the transmitter UE may sense the channel and determine the availability of resources. The determination may be, for example, based on carrier sensing, sidelink transmission decoding, reference signal received power (RSRP) measurement (and the like) to determine whether a channel (or part of channel) is available for transmission.

There may be range-based applications that involve sidelink communication, where a transmission is intended for only devices (e.g., UEs) within a given range. Such range-based communication is a typical application in V2X where data packets may only need to be successfully delivered to UEs within certain range. For example, (vehicle) UE's safety related V2X messages may need to be delivered to other vehicle UEs within a range (e.g., depending on the UEs speed).

In such cases, when there is packet arrival (for transmission), a transmitter (Tx) UE may select a resource for transmission, for example from a set (or pool) of candidate resources, identified/selected based on sensing. Unfortunately, this autonomous approach does not provide receiver protection as the sensing only identifies the resource that is available from the Tx UE's perspective and, the identified resource may not be free from an intended receiver UE's perspective (e.g., the hidden node problem described above).

Figure 6A:
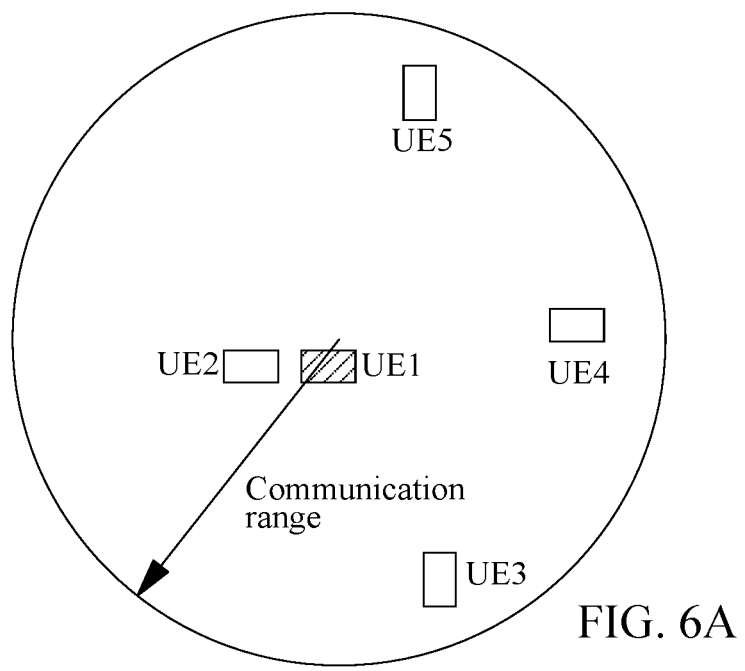
FIGS. 6A and 6B illustrate an example scenario of sidelink communications and availability of sidelink channels, in accordance with some aspects of the present disclosure.
Figure 6B:

This scenario may be understood with reference to FIGS. 6A and 6B. FIG. 6A illustrates a set of receiver UEs (UE2-UE5) within a communication range of a transmitter UE (UE1). In the illustrated example, UE1 has a packet arrive with a communication range requirement (e.g., the packet is intended for the other UEs within the indicated communication range).

As illustrated in FIG. 6B, different UEs see different interference patterns/levels and, thus, consider the same channel as free differently. For example, at time T1 UE1 (the Tx UE) considers the channel free starting from time $T_1$. In the illustrated example, however, while UE2, UE3 and UE5 also see the channel as free at time $T_1$, UE4 sees the channel as busy at that time and the channel is not free from all of the Rx UEs' perspective until $T_2$. As a result, a transmission sent by UE1 at time $T_1$ may not be successfully received by all of the intended recipients.

Aspects of the present disclosure, however, may help address such hidden node problems in V2X communications systems. As will be described in greater detail below, a range-based handshake mechanism for V2X communication described herein may help ensure that resources are available from the perspective of both Tx and Rx UEs. The mechanism (or protocol) propose herein may be applicable to V2X communication in licensed spectrum (e.g., ITS) where hidden nodes may be other V2X UEs, and may also be applicable in V2X unlicensed spectrum where a hidden node may be a device communicating via another wireless technology.

FIG. 7 illustrates example operations 700 for wireless communications by a UE, in accordance with certain aspects of the present disclosure. For example, operations 700 may be performed by a transmitter V-UE (e.g., implemented as a UE 120 of FIG. 1 or FIG. 4) to efficiently select resources for communicating with one or more receiver V-UEs.

Operations 700 begin, at 702, by transmitting, on a sidelink channel used for communicating with other UEs, a control message indicating at least one range. At 704, the UE monitors for feedback associated with detection of the control message by one or more other UEs within the indicated range. At 706, the UE transmits data if the feedback indicates at least that the sidelink channel is free.

Figure 8:
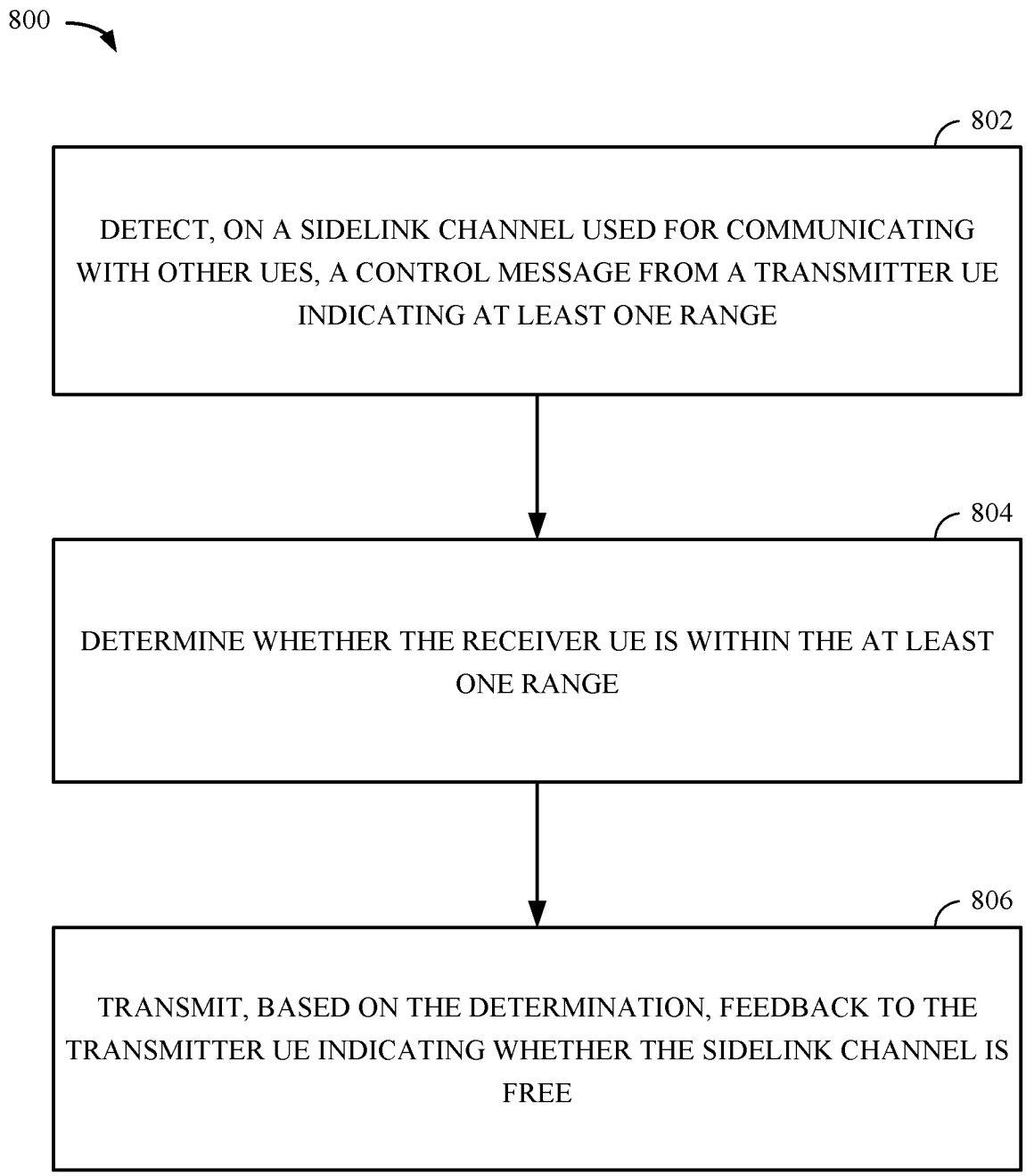
FIG. 8 illustrates example operations for wireless communications by a receiver UE, in accordance with certain aspects of the present disclosure.

FIG. 8 illustrates example operations 800 that may be considered complementary to operations 700 of FIG. 7. For example, operations 800 may be performed by a receiver V-UE (e.g., implemented as a UE 120 of FIG. 1 or FIG. 4) to communicate with a transmitter V-UE performing operations 700 of FIG. 7.

Operations 800 begin, at 802, by detecting, on a sidelink channel used for communicating with other UEs, a control message from a transmitter UE indicating at least one range. At 804, the UE determines whether the receiver UE is within the at least one range. At 806, the UE transmits, based on the determination, feedback to the transmitter UE indicating whether the sidelink channel is free. More specifically, the feedback is transmitted if the determination indicates that the receiver UE is within the at least one range.

The control message transmitted by the transmitter UE that indicates the range (e.g., based on a communication range requirement) may be sent via physical layer signaling (e.g., similar to SCI, or in an SCI format) or similar to a RTS (request-to-send) in Wi-Fi. In either case, other Rx UE(s) may transmit the feedback upon detection of the control message. The feedback may indicate whether the channel is free (from the perspective of the Rx UE providing the feedback) and/or if a channel resource is available for sidelink transmission.

By providing the range in the control message sent by the Tx-UE, only relevant UEs may reply. For example, an Rx-UE may only send the feedback if it is within the range indicated by the control message.

In some cases, the feedback may be similar to hybrid automatic repeat request (HARQ) feedback (ACK/NACK). In other cases, the feedback may be similar to Wi-Fi CTS (clear-to-send), or some other type of feedback message indicating at least whether channel is free.

The Tx UE may detect the feedback from the other UEs following the control message transmission and decide, based on the detected feedback, whether to transmit the data on the channel or certain resources thereof.

According to a first option, the Tx UE may transmit the data following feedback detection, if feedbacks indicate that channel is free. In this context, the channel may be considered free if the feedback indicates that channel is free from the perspective of all other relevant UEs (or a certain condition is met). Otherwise, the Tx UE may back off (refrain from attempting to access the channel for a back-off period), and transmit the control message again following the back-off period. This first option may be applicable to sidelink communication in unlicensed spectrum.

According to this first option, to determine whether a channel is free, the relevant UE may perform sensing (e.g., measure energy level/RSRP/RSSI/etc.) and compare the measurement from sensing to a threshold. In such cases, the channel may be considered free (from the relevant/Rx UE perspective) if the measured energy or RSRP is below threshold. The threshold may have a pre-determined value or may be indicated by the control message. The energy level/RSRP/RSSI/etc. may be measured in a certain resource (e.g., a Rx UE may measure the energy level in a measurement gap following the detection of control message).

According to a second option, the Tx UE may transmit the data following feedbacks detection, if the feedback indicates a resource (or resources) available for transmission. In this case, the Tx UE may indicate a time/frequency resource that the UE intends to use for the data transmission in the control message. For example, the Tx UE may indicate a resource (e.g., a resource in a future slot) the Tx UE has selected based on sensing.

According to this option, a Rx UE may check if the indicated resource has also been reserved by a different Tx UE (e.g., the Rx UE may also be performing its own sensing so it has this information). If the Rx UE feedback indicates the resource is not available (e.g., if it has learned that another Tx UE2 with higher traffic priority has reserved that resource), the Tx UE may give up the selected resource. In one example, the Tx UE may perform resource selection again (to select a different resource).

To determine whether the indicated resource is available according to this second option, the relevant UE may determine that the resource is available if no other UEs indicate that they have reserved the resource. For example, an Rx UE may determine the resource is available if no other UEs having higher traffic priority have reserved the resource, or if no other UEs reserve the resource prior to the control message transmission.

In some cases, the control message indicating the range may convey only control signaling (i.e., is not a data packet transmission). In such cases, the control message may be transmitted in a same or similar format as sidelink control information (SCI).

In some cases, the Tx UE may send the control message upon packet arrival (or when it has packet ready for transmission). The Tx UE may only send the control message if it sees the channel is free (or a selected resource is available for the control signaling transmission).

To determine whether channel (or resource) is free for control signaling transmission, the Tx UE may sense the channel. For example, the Tx UE may use energy detection based carrier sensing (e.g., Type 1 channel access as specified in 3GPP, CAT 4 LBT, etc.) and may consider the channel is free if the energy detection based carrier sensing is successful. As an alternative (or in addition), the Tx UE may determine whether there is a resource available for the control message transmission. For example, the Tx UE may decode transmissions from other UEs (and the Tx UE may also perform RSRP measurement) and select an available resource (e.g., resources that have not been reserved by other UEs) for the control message transmission.

The control message may include various types of information. For example, the control message may include the Tx UE ID, the Tx UE location (e.g., geographical location or a zone location), and a desired communication range. The range may be indicated via a parameter mapped to absolute range values in unit meter or it may include a reference RSRP, which is relevant to range. In some cases, the control message may include a time and/or frequency resource the Tx UE intends to use to transmit data (e.g., a time/frequency resource the Tx UE has selected based on its own sensing for its data transmission). In some cases, the control message may also indicate threshold for energy detection/RSRP/RSSI (for the Rx UE to use in determining if a channel/resource is free) and/or a traffic priority of the Tx UE.

In some cases, specifying a range in the control message may limit which Rx UEs send the feedback. For example, the feedback may be sent only by relevant UEs within the communication range. In some cases, the Rx UE may determine the range from the Tx UE (e.g., based on location of the Tx UE and its own location) and send feedback (only) if the determined range is smaller than the range indicated by the Tx UE (in the control message).

Alternatively, the range may be implied by a measured RSRP. The Rx UE may measure RSRP based on reference signals from the Tx UE and send the feedback if the measured RSRP is larger than the reference RSRP indicated by the Tx UE (indicating it is within range in terms of RSRP).

The feedback type (type of feedback message) sent by a relevant UE may depend on whether the channel is free as seen by the relevant UE. For example, there may be two types of feedback for indicating a busy channel or a free channel. Alternatively, the feedback may be sent only when the channel is busy or resource is unavailable (e.g., the feedback has only one state). In such cases, the Tx UE may consider a lack of feedback from an Rx UE as an indication the channel is free (or resource is available) from that Rx UE's perspective. Alternatively, the feedback may be sent only when the channel is free or the resource is available (again, the feedback has only one state). In such cases, the Tx UE may consider a lack of feedback from an Rx UE as an indication the channel is busy (or resource is unavailable).

In some cases, the feedback may be transmitted in an implied resource. For example, a relevant UE may determine a resource to use for the feedback transmission based on (a resource used for) the control message transmission. For example, the feedback may be transmitted in a same frequency location as the control message. Time resources may also be implied. For example, the feedback may be transmitted following the control message after a pre-determined gap duration.

As noted above, the Rx UE feedback may be similar to HARQ feedback. For example, the Rx UE may feedback a single bit (0/1) to indicate whether the channel is free (or whether the resource is available) as seen by that Rx UE. In some cases, the feedback may also include other information, such as an energy level (e.g., wide-band energy detection or RSRP/RSRQ/RSSI/CBR) measured by the Rx UE (e.g., with some number of bits to indicate multiple energy levels).

In some cases, the feedback may also indicate a time and/or duration the channel would be busy. For example, the Rx UE may decode a transmission from another UE that indicates the duration of its transmission. In such cases, the relevant UE would also know the duration the channel is to be busy, and can indicate this to the Tx UE via the feedback.

The Rx UE feedback may be sent with a constant power (e.g., at a pre-determined power level). In such cases, the power of the feedback transmission does not rely on distance or measurement on the sidelink. As an alternative, the power may be determined from a measured energy level (e.g., of RSRP, RSRQ, RSSI, etc.). For example, the feedback may be sent with a higher power if the relevant UE measures a higher energy level (interference) or the feedback may be sent with a higher power if the relevant UE measures a smaller (or larger) RSRP from the Tx UE.

In some cases, the power of the feedback may be determined based on a modulation and coding scheme (MCS) the Tx UE would be using, which may be indicated in the control message. For example, the feedback may be sent with higher power if the MCS index is larger and/or if rank of the transmission is high (e.g., with higher rank resulting in higher feedback power).

In some cases, for the same feedback type (e.g., two feedback types when using 1 bit to indicate whether channel is busy) to the Tx UE, different Rx UEs may use the same signal waveform and/or feedback resource (time/frequency/code domain resource). In such cases, when the feedback is to indicate whether the channel is free or not, the Tx UE needs not to distinguish feedback from different relevant UEs. In other words, the Tx UE may only need to identity the two feedback types (i.e., whether channel is busy as seen by the relevant UEs' perspective). For example, upon detection of a control message, the relevant UEs that see a busy channel may transmit the same feedback on the same resource, while feedback indicating a free channel may be transmitted in a different resource (or on the same resource but with a different waveform/sequence for different feedback type).

In some cases, a gap between the control message and feedback may have a pre-determined value. For example, the pre-determined value may be based on certain regulation requirements (e.g., 16 us), or based on some other pre-determined value (e.g., 25 us). This gap value may also be applicable to the gap between feedback and data transmission. This gap may also be used by an Rx UE to measure the energy level (to determine if the channel is free).

The Tx UE may transmit data following detection of the feedback (that indicates a free channel or available resource). For example, the data transmission may follow the feedback, with a pre-determined gap duration in between.

In a first case, the Tx UE transmits data if feedbacks indicate channel is free. In this case, the detected feedback by the Tx UE may indicate the channel is free or a resource is available (e.g., and no feedback may indicate a busy channel or occupied resource from relevant UEs).

In a second case, the Tx UE may transmit data if channel is not busy for all relevant UEs. In this case, the Tx UE may transmit when at least one or multiple relevant UEs see a free channel (or sees an available resource).

In a third case, the Tx UE may transmit data if one or more conditions can be met. For example, such a condition may indicate the ratio of relevant UEs seeing a free channel (as indicated by their feedback). In such cases, comparing the detected ACK (channel free) and NACK (channel busy) power may indicate the ratio. For example, if ACK power is higher than NACK power, that means more relevant UEs see a free channel and the Tx UE may transmit if the ACK power is higher than NACK power or if the ratio of ACK power and NACK power is higher than a threshold.

In some cases, the Tx UE may back off if a channel is busy (to some or all relevant UEs) according to the first option described above (or it may back off if one or more conditions have not been met). The Tx UE may give up the resource (indicated in the control message) if the resource is not available, according the second option described above. In such cases, the Tx UE may perform resource selection again to select other available resources.

The range-based handshake mechanism according to the first option may be illustrated by an example based on sidelink communication in unlicensed spectrum. In this example, the Tx UE transmits a control message in the unlicensed band. The control message may contain at least location of the Tx UE and range information. As noted above, there may be a gap following the control message transmission (e.g., of a pre-determined duration, such as 25 us).

Upon detection of the control message, an Rx UE determines if it is within the range based on the Tx UE location and its own location. If the Rx UE determines it is within the range, the Rx UE may perform channel sensing during the gap. For example, it measures energy level within the gap, and determines whether the energy level is at or below an energy level threshold.

An Rx UE within the range may send feedback to the Tx UE following the gap. For example, the Rx UE sends the feedback only if the measured energy level is at or below an energy level threshold (in other words, the Rx UE may consider the channel is free). In another example, the Rx UE sends the feedback to indicate the measured energy level, or, to indicate whether the energy level is at or below the energy level threshold (whether the channel is free).

The Tx UE may transmit data following detection of feedback, if the feedback indicates the channel is free. For example, the Tx UE may transmit data if it can detect feedback indicating the measured energy is below the threshold. In this option, the Tx UE may also indicate a time/frequency resource in the control message, which is the resource that the Tx UE intends to reserve for its data transmission.

The range-based handshake mechanism according to the second option may be illustrated by an example based on sidelink communication in licensed (or ITS) spectrum. Again, the Tx UE transmits control message on sidelink. In this case, however, the control message may indicate at least a time/frequency resource in a future slot (that the Tx UE intends to use for data transmission). The control message may contain following information as well: location of Tx UE, range information, Tx UE ID, intended Rx UE ID, group ID, traffic priority, etc.

Upon detection of the control message, an Rx UE determines if the indicated resource is available. The Rx UE may first determine if the control message is intended for it (whether it is a relevant UE), for example, based on the range (e.g., whether the Rx UE is within a range threshold to the Tx UE), or based on an ID check (whether the control message has the Rx UE ID, or whether the control message has group ID that the Rx UE belongs to). The Rx UE may also perform sidelink decoding and RSRP measurement to determine whether a resource is available. For example, the Rx UE may consider the resource as available if no other UE has reserved the resource, if another UE has reserved the resource but RSRP measured from that UE is below an RSRP threshold, or if another UE has reserved the resource but traffic priority of that UE is lower than priority of the Tx UE. If the Rx UE determines that the indicated resource is not available, the Rx UE may send feedback to the Tx UE (alternatively, the Rx UE may send feedback to indicate whether the resource is available).

A relevant Rx UE may send feedback to the Tx UE. For example, the Rx UE sends the feedback only if the indicated resource by Tx UE is not available. The Tx UE may transmit data in the indicated resource if no feedback indicates the resource unavailable. Alternatively, the Tx UE may transmit data if there is feedback indicating the resource is available.

As described herein, a range-based mechanism may help address hidden node problems, which can create interference resulting in various packets not getting through successfully.

Figure 9:
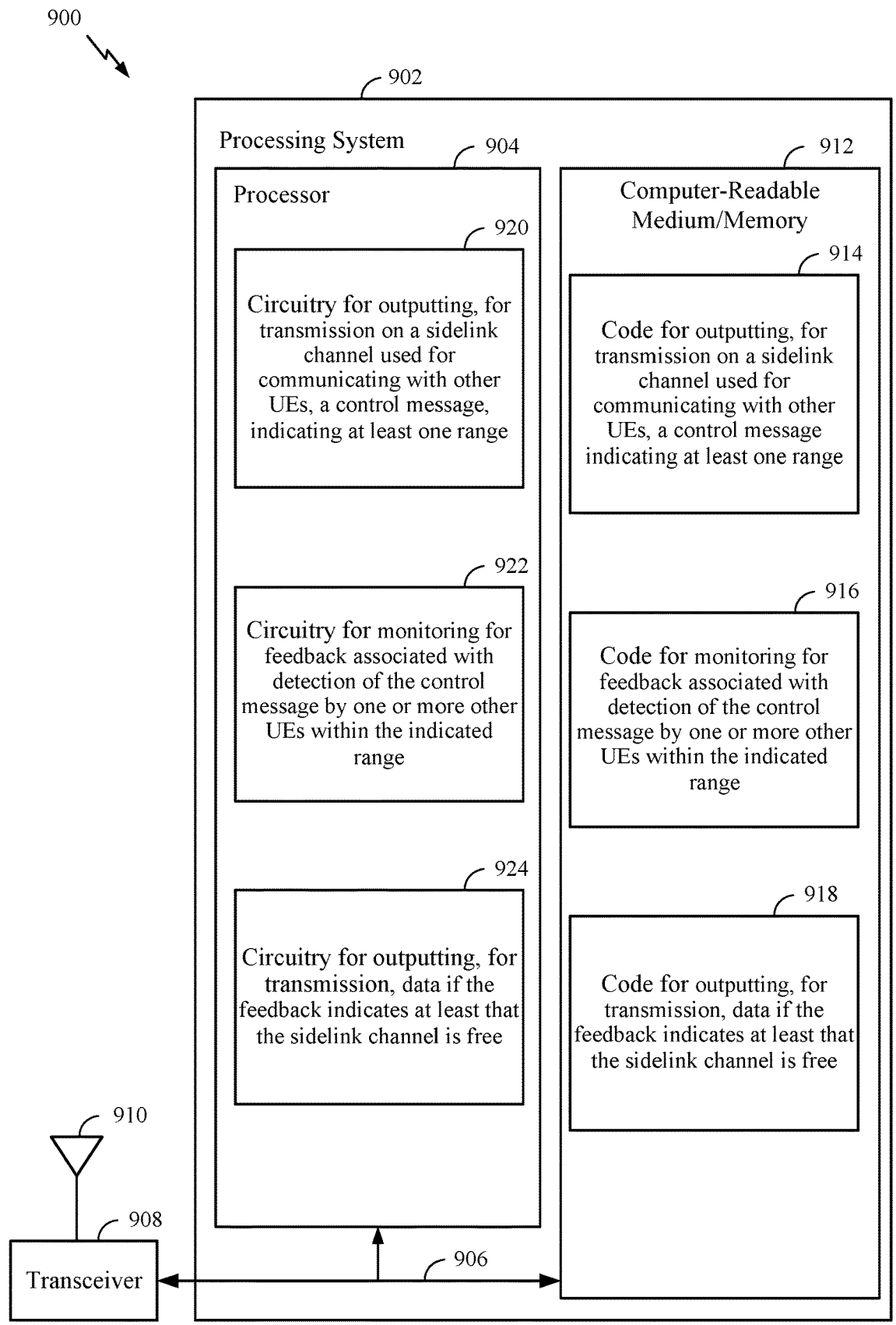
FIG. 9 illustrates a communications device that may include various components configured to perform the operations illustrated in FIG. 7, in accordance with certain aspects of the present disclosure.

FIG. 9 illustrates a communications device 900 that may include various components (e.g., corresponding to means-plus-function components) configured to perform operations for the techniques disclosed herein, such as the operations illustrated in FIG. 7. The communications device 900 includes a processing system 902 coupled to a transceiver 908. The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 7. In certain aspects, computer-readable medium/memory 912 stores code 914 for outputting, for transmission on a sidelink channel used for communicating with other UEs, a control message indicating at least one range; code 916 for monitoring for feedback associated with detection of the control message by one or more other UEs within the indicated range; and code 918 for outputting, for transmission, data if the feedback indicates at least that the sidelink channel is free. In certain aspects, the processor 904 has circuitry configured to implement the code stored in the computer-readable medium/memory 912. The processor 904 includes circuitry 920 for outputting, for transmission on a sidelink channel used for communicating with other UEs, a control message indicating at least one range; circuitry 922 for monitoring for feedback associated with detection of the control message by one or more other UEs within the indicated range; and circuitry 924 for outputting, for transmission, data if the feedback indicates at least that the sidelink channel is free.

Figure 10:
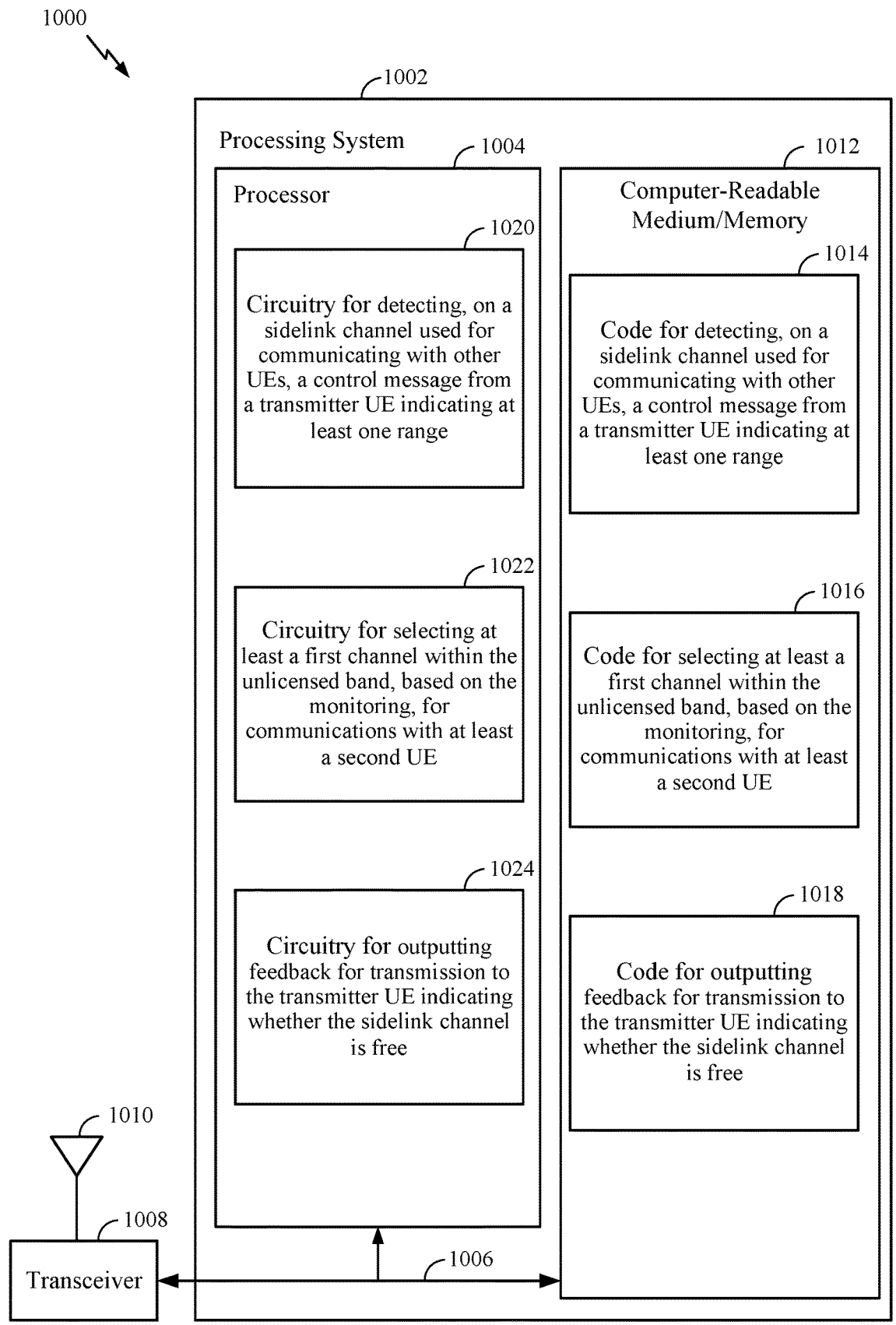
FIG. 10 illustrates a communications device that may include various components configured to perform the operations illustrated in FIG. 8, in accordance with certain aspects of the present disclosure.

FIG. 10 illustrates a communications device 1000 that may include various components (e.g., corresponding to means-plus-function components) configured to perform operations for the techniques disclosed herein, such as the operations illustrated in FIG. 8. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 8. In certain aspects, computer-readable medium/memory 1012 stores code 1014 for detecting, on a sidelink channel used for communicating with other UEs, a control message from a transmitter UE indicating at least one range; code 1016 for determining the receiver UE is within the at least one range; and code 1018 for outputting feedback for transmission to the transmitter UE indicating whether the sidelink channel is free. In certain aspects, the processor 1004 has circuitry configured to implement the code stored in the computer-readable medium/memory 1012. The processor 1004 includes circuitry 1020 for detecting, on a sidelink channel used for communicating with other UEs, a control message from a transmitter UE indicating at least one range; circuitry 1022 for determining the receiver UE is within the at least one range; and circuitry 1024 for outputting feedback for transmission to the transmitter UE indicating whether the sidelink channel is free.

Example Aspects

Aspect 1: A method for wireless communications by a transmitter user equipment (UE), comprising: transmitting, on a sidelink channel used for communicating with other UEs, a control message indicating at least one range; monitoring for feedback associated with detection of the control message by one or more other UEs within the indicated range; and transmitting data if the feedback indicates at least that the sidelink channel is free.

Aspect 2: The method of Aspect 1, wherein: the control message specifies resources for transmitting the data on the sidelink channel; and the feedback indicates the sidelink channel is free if the specified resources are available.

Aspect 3: The method of Aspect 2, further comprising: if the feedback indicates the specified resources are not available, giving up transmitting in the specified resources.

Aspect 4: The method of any one of Aspects 1-3, wherein the control message is transmitted in a sidelink control information (SCI) format.

Aspect 5: The method of any one of Aspects 1-4, wherein transmission of the control message is triggered by packet arrival or the transmitter UE having a packet ready for transmission.

Aspect 6: The method of any one of Aspects 1-5, further comprising: determining whether the sidelink channel is available for transmission of the control message if, at least one of, the sidelink channel is free or resource is available on the sidelink channel for transmission of the control message.

Aspect 7: The method of Aspect 6, wherein the determination is based on at least one of sensing the sidelink channel or decoding a transmission from at least one of the other UEs.

Aspect 8: The method of any one of Aspects 1-7, wherein the control message comprises at least one of: an ID of the transmitter UE, a location of the transmitter UE, the at least one range, a reference signal received power (RSRP) threshold, time and/or frequency resources to be used by the transmitter UE to transmit the data, or a threshold value used by a UE detecting the control message to determine whether the sidelink channel is free.

Aspect 9: The method of any one of Aspects 1-8, wherein the feedback is monitored in a frequency location associated with the transmission of the control message.

Aspect 10: The method of any one of Aspects 1-9, further comprising beginning to monitor for the feedback a defined gap duration after transmitting the control message.

Aspect 11: The method of any one of Aspects 1-10, wherein the feedback further indicates additional information, wherein the additional information includes at least one of an energy level detected at a UE sending the feedback, a time the sidelink channel will be busy or free, or a duration the sidelink channel will be busy or free.

Aspect 12: The method of any one of Aspects 1-11, wherein the feedback is transmitted, by one or more of the other UEs that detected the control message, with: a constant power; a power determined from measured energy level of the control message as detected; or a power determined based on at least one of a modulation and coding scheme (MCS) indicated in the control message or a rank of transmission of the control message.

Aspect 13: The method of any one of Aspects 1-12, wherein: one or more of the other UEs seeing the sidelink channel as being busy transmit their feedback on a first resource; and one or more the other UEs seeing the sidelink channel as being free transmit their feedback on a second resource.

Aspect 14: The method of any one of Aspects 1-13, wherein: one or more of the other UEs seeing the sidelink channel as being busy transmit their feedback as a first waveform on a first resource; and one or more other UEs seeing the sidelink channel as being free transmit their feedback as a second waveform on the first resource.

Aspect 15: The method of any one of Aspects 1-14, further comprising determining the sidelink channel is free if one or more conditions relating to the feedback are met.

Aspect 16: The method of Aspect 15, wherein the one or more conditions comprise the feedback or a lack of any feedback indicates the sidelink channel is free or resource is available on the sidelink channel.

Aspect 17: The method of Aspect 15, wherein the one or more conditions comprise the feedback indicates that the sidelink channel is free for all UEs within the at least one range.

Aspect 18: The method of Aspect 15, wherein the one or more conditions comprise the feedback indicates a ratio of UEs within the indicated at least one range seeing the sidelink channel being free to the total UEs within the at least one range.

Aspect 19: The method of Aspect 15, wherein the determination of the sidelink channel is free comprises determining a ratio, based on a relative power, of positive acknowledgment (ACK) feedback detected relative to negative acknowledgment (NACK) feedback detected.

Aspect 20: A method for wireless communications by a receiver user equipment (UE), comprising: detecting, on a sidelink channel used for communicating with other UEs, a control message from a transmitter UE indicating at least one range; determining whether the receiver UE is within the at least one range; and transmitting, based on the determination, feedback to the transmitter UE indicating whether the sidelink channel is free.

Aspect 21: The method of Aspect 20, wherein: the control message specifies resources for transmitting data on the sidelink channel; the receiver UE determines whether the specified resources are available; and the feedback indicates the sidelink channel is free if the receiver UE determines the specified resources are available.

Aspect 22: The method of Aspect 21, wherein: the determination indicates the specified resources are available if no other UEs have reserved the specified resources.

Aspect 23: The method of any one of Aspects 20-22, wherein the control message was transmitted in a sidelink control information (SCI) format.

Aspect 24: The method of any one of Aspects 20-23, wherein the control message comprises at least one of: an ID of the transmitter UE, a location of the transmitter UE, the range, a reference signal received power (RSRP) relevant to the desired communication range, at least one of time resource or frequency resource to be used by the transmitter UE to transmit the data, or a threshold value used by a UE detecting the control message to determine whether the sidelink channel is free.

Aspect 25: The method of any one of Aspects 20-24, wherein the determination that the receiver UE is within the at least one range is based on at least one of: a location of the transmitter UE; a location of the receiver UE; or a reference signal received power (RSRP) associated with the control message as measured at the receiver UE.

Aspect 26: The method of any one of Aspects 20-25, further comprising: measuring an energy level; and determining that the sidelink channel is free if the measure energy level is equal to or below an energy level threshold, wherein the feedback is transmitted based on the determination that the sidelink channel is free.

Aspect 27: The method of Aspect 26, wherein the energy level is measured in a gap following the detection of the control message.

Aspect 28: The method of Aspect 26, wherein the energy level is measured in a sensing window.

Aspect 29: The method of any one of Aspects 20-28, wherein: the feedback is transmitted only when the sidelink channel is free or only when the sidelink channel is busy.

Aspect 30: The method of any one of Aspects 20-29, wherein the feedback is transmitted in a frequency location associated with the detection of the control message.

Aspect 31: The method of any one of Aspects 20-30, wherein the feedback is transmitted a defined gap duration after detecting the control message.

Aspect 32: The method of any one of Aspects 20-31, wherein: the feedback indicates whether the sidelink channel is free and additional information; and the additional information includes at least one of an energy level associated with the control message as detected at the receiver UE, a time the sidelink channel will be busy or free, or a duration the sidelink channel will be busy or free.

Aspect 33: The method of any one of Aspects 20-32, wherein the feedback is transmitted with: a constant power; a power determined from measured energy level of the detected control message; or a power determined based on at least one of a modulation and coding scheme (MCS) indicated in the control message or a rank of transmission of the control message.

Aspect 34: The method of any one of Aspects 20-33, wherein: the feedback is transmitted on a first resource to indicate the receiver UE sees the sidelink channel as being busy; and the feedback is transmitted on a second resource to indicate the receiver UE sees the sidelink channel as being free.

Aspect 35: The method of any one of Aspects 20-34, wherein: the feedback is transmitted as a first waveform on a first resource to indicate the receiver UE sees the sidelink channel as being busy; and the feedback is transmitted as a second waveform on the first resource to indicate the receiver UE sees the sidelink channel as being free.

Aspect 36: A transmitter user equipment, comprising at least one antenna and means for performing the operations of one or more of Aspects 1-19.

Aspect 37: A transmitter user equipment, comprising a transceiver and a processing system including at least one processor configured to perform the operations of one or more of Aspects 1-19.

Aspect 38: A receiver user equipment, comprising at least one antenna and means for performing the operations of one or more of Aspects 20-35.

Aspect 39: A receiver user equipment, comprising a transceiver and a processing system including at least one processor configured to perform the operations of one or more of Aspects 20-35.

Aspect 40: A computer-readable medium for wireless communications by a transmitter UE, comprising codes executable by an apparatus to: output, for transmission on a sidelink channel used for communicating with other UEs, a control message indicating at least one range; monitor for feedback associated with detection of the control message by one or more other UEs within the indicated range; and output, for transmission, data if the feedback indicates at least that the sidelink channel is free.

Aspect 41: A computer-readable medium for wireless communications by a receiver UE, comprising codes executable by an apparatus to: detect, on a sidelink channel used for communicating with other UEs, a control message from a transmitter UE indicating at least one range; determine the receiver UE is within the at least one range; and output feedback for transmission to the transmitter UE indicating whether the sidelink channel is free.

Aspect 42: An apparatus for wireless communications by a transmitter user equipment (UE), comprising: an interface configured to output, for transmission on a sidelink channel used for communicating with other UEs, a control message indicating at least one range; and a processing system configured to monitor for feedback associated with detection of the control message by one or more other UEs within the indicated range, wherein the interface is further configured to output data for transmission if the feedback indicates at least that the sidelink channel is free.

Aspect 43: An apparatus for wireless communications by a receiver user equipment (UE), comprising: a processing system configured to detect, on a sidelink channel used for communicating with other UEs, a control message from a transmitter UE indicating at least one range and determine the receiver UE is within the at least one range; and an interface configured to output feedback for transmission to the transmitter UE indicating whether the sidelink channel is free.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, processors 458, 464 and 466, and/or controller/processor 480 of the UE 120a and/or processors 420, 430, 438, and/or controller/processor 440 of the BS 110a shown in FIG. 4 may be configured to perform operations 700 of FIG. 7 and/or operations 800 of FIG. 8.

Means for receiving may include a transceiver, a receiver or at least one antenna and at least one receive processor illustrated in FIG. 4. Means for transmitting, means for sending or means for outputting may include, a transceiver, a transmitter or at least one antenna and at least one transmit processor illustrated in FIG. 4. Means for monitoring, means for giving up, means for determining, means for beginning to monitor, means for detecting, means for performing and means for measuring may include a processing system, which may include one or more processors, such as processors 458, 464 and 466, and/or controller/processor 480 of the UE 120a and/or processors 420, 430, 438, and/or controller/processor 440 of the BS 110a shown in FIG. 4.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 7 and/or FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a transmitter user equipment (UE), comprising:
   transmitting, on a sidelink channel used for communicating with other UEs, a control message indicating at least one range, wherein the control message comprises at least one of:
       a reference signal received power (RSRP) threshold relevant to the at least one range, or
       a threshold value used by another UE detecting the control message to determine whether the sidelink channel is free;
   monitoring for feedback associated with detection of the control message by one or more other UEs within the indicated range; and
   transmitting data if the feedback indicates that the sidelink channel is free.

2. The method of claim 1, wherein:
   the control message specifies resources for transmitting the data on the sidelink channel; and
   the feedback indicates the sidelink channel is free if the specified resources are available.

3. The method of claim 2, further comprising:
   if the feedback indicates the specified resources are not available, giving up transmitting in the specified resources.

4. The method of claim 1, wherein the control message is transmitted in a sidelink control information (SCI) format.

5. The method of claim 1, wherein transmission of the control message is triggered by packet arrival or the transmitter UE having a packet ready for transmission.

6. The method of claim 1, further comprising:
   determining the sidelink channel is available for transmission of the control message if the sidelink channel is free or if a resource is available on the sidelink channel for transmission of the control message.

7. The method of claim 6, wherein the determination is based on at least one of sensing the sidelink channel or decoding a transmission from at least one of the other UEs.

8. The method of claim 1, wherein the control message further comprises at least one of:
   an ID of the transmitter UE, a location of the transmitter UE, the at least one range, or at least one of a time resource or a frequency resource to be used by the transmitter UE to transmit the data.

9. The method of claim 1, wherein the feedback is monitored in a frequency location associated with the transmission of the control message.

10. The method of claim 1, further comprising beginning to monitor for the feedback a defined gap duration after transmitting the control message.

11. The method of claim 1, wherein the feedback further indicates additional information, wherein the additional information includes at least one of an energy level detected at a UE sending the feedback, a time the sidelink channel will be busy or free, or a duration the sidelink channel will be busy or free.

12. The method of claim 1, further comprising determining the sidelink channel is free if one or more conditions relating to the feedback are met.

13. The method of claim 12, wherein the one or more conditions comprise:
   the feedback or a lack of any feedback indicates the sidelink channel is free or resource is available on the sidelink channel;
   the feedback indicates that the sidelink channel is free for all UEs within the at least one range; or
   the feedback indicates a ratio of UEs within the indicated at least one range seeing the sidelink channel being free to the total UEs within the at least one range.

14. The method of claim 12, wherein the determination the sidelink channel is free comprises determining a ratio, based on a relative power, of positive acknowledgment (ACK) feedback detected relative to negative acknowledgment (NACK) feedback detected.

15. A method for wireless communications by a receiver user equipment (UE), comprising:
   detecting, on a sidelink channel used for communicating with other UEs, a control message from a transmitter UE indicating at least one range, wherein the control message comprises at least one of:
       a reference signal received power (RSRP) threshold relevant to the at least one range, or
       a threshold value used by the receiver UE to determine whether the sidelink channel is free;
   determining whether the receiver UE is within the at least one range; and
   transmitting, based on the determination, feedback to the transmitter UE indicating whether the sidelink channel is free.

16. The method of claim 15, wherein:
the control message specifies resources for transmitting data on the sidelink channel;
the receiver UE determines whether the specified resources are available; and
the feedback indicates the sidelink channel is free if the receiver UE determines the specified resources are available.

17. The method of claim 16, wherein:
the determination indicates the specified resources are available if no other UEs have reserved the specified resources.

18. The method of claim 15, wherein the control message comprises at least one of:
an ID of the transmitter UE, a location of the transmitter UE, the range, or at least one of time resource or a frequency resource to be used by the transmitter UE to transmit data.

19. The method of claim 15, wherein the determination whether the receiver UE is within the at least one range is based on at least one of:
a location of the transmitter UE;
a location of the receiver UE; or
an RSRP associated with the control message as measured at the receiver UE.

20. The method of claim 15, further comprising:
measuring an energy level; and
determining that the sidelink channel is free if the measured energy level is equal to or below the threshold value, wherein the feedback is transmitted based on the determination that the sidelink channel is free.

21. The method of claim 20, wherein:
the energy level is measured in a gap following the detection of the control message; or
the energy level is measured in a sensing window.

22. The method of claim 15, wherein:
the feedback is transmitted only when the sidelink channel is free or only when the sidelink channel is busy;
the feedback is transmitted in a frequency location associated with the detection of the control message; or
the feedback is transmitted a defined gap duration after detecting the control message.

23. The method of claim 15, wherein:
the feedback indicates whether the sidelink channel is free and additional information; and
the additional information includes at least one of an energy level associated with the control message as detected at the receiver UE, a time the sidelink channel will be busy or free, or a duration the sidelink channel will be busy or free.

24. The method of claim 15, wherein the feedback is transmitted with:
a constant power;
a power determined from measured energy level of the detected control message; or
a power determined based on at least one of a modulation and coding scheme (MCS) indicated in the control message or a rank of transmission of the control message.

25. The method of claim 15, wherein:
the feedback is transmitted on a first resource to indicate the receiver UE sees the sidelink channel as being busy; and
the feedback is transmitted on a second resource to indicate the receiver UE sees the sidelink channel as being free.

26. The method of claim 15, wherein:
the feedback is transmitted as a first waveform on a first resource to indicate the receiver UE sees the sidelink channel as being busy; and
the feedback is transmitted as a second waveform on the first resource to indicate the receiver UE sees the sidelink channel as being free.

27. A transmitter user equipment (UE), comprising:
a transmitter configured to transmit, on a sidelink channel used for communicating with other UEs, a control message indicating at least one range, wherein the control message comprises at least one of:
a reference signal received power (RSRP) threshold relevant to the at least one range, or
a threshold value used by another UE detecting the control message to determine whether the sidelink channel is free; and
a processing system configured to monitor for feedback associated with detection of the control message by one or more other UEs within the indicated range, wherein:
the transmitter is further configured to transmit data if the feedback indicates at least that the sidelink channel is free.

28. The transmitter UE of claim 27, wherein, at least one of:
the processing system is further configured to determine the sidelink channel is available for transmission of the control message if the sidelink channel is free; or if a resource is available on the sidelink channel for transmission of the control message; or
the processing system is further configured to determine the sidelink channel is available for transmission of the control message based on at least one of sensing the sidelink channel or decoding a transmission from at least one of the other UEs.

29. A receiver user equipment (UE), comprising:
a processing system configured to:
detect, on a sidelink channel used for communicating with other UEs, a control message from a transmitter UE indicating at least one range, wherein the control message comprises at least one of:
a reference signal received power (RSRP) threshold relevant to the at least one range, or
a threshold value used by the UE to determine whether the sidelink channel is free; and
determine whether the receiver UE is within the at least one range; and
a transmitter configured to transmit, based on the determination, feedback to the transmitter UE indicating whether the sidelink channel is free.

30. The receiver UE of claim 29, wherein, at least one of:
the processing system is further configured to measure an energy level and determine that the sidelink channel is free if the measured energy level is equal to or below the threshold value, wherein the feedback is transmitted based on the determination that the sidelink channel is free;
the processing system is further configured to measure the energy level in a gap following detection of the control message; or
the processing system is further configured to measure the energy level in a sensing window.

* * * * *